United States Patent
Gan et al.

(10) Patent No.: US 9,812,710 B2
(45) Date of Patent: Nov. 7, 2017

(54) COPPER DOPED SVO COMPOUNDS AS HIGH RATE CATHODE MATERIALS

(71) Applicant: Greatbatch Ltd., Clarence, NY (US)

(72) Inventors: Hong Gan, Miller Place, NY (US); Joseph Lehnes, Williamsville, NY (US); Weibing Xing, Littleton, CO (US)

(73) Assignee: Greatbatch Ltd., Clarence, NY (US)

( * ) Notice: Subject to any disclaimer, the term of this patent is extended or adjusted under 35 U.S.C. 154(b) by 271 days.

(21) Appl. No.: 14/552,040

(22) Filed: Nov. 24, 2014

(65) Prior Publication Data

US 2015/0147647 A1    May 28, 2015

Related U.S. Application Data

(60) Provisional application No. 61/907,655, filed on Nov. 22, 2013.

(51) Int. Cl.
| | |
|---|---|
| *H01M 4/54* | (2006.01) |
| *H01M 8/20* | (2006.01) |
| *H01M 4/48* | (2010.01) |
| *H01M 8/18* | (2006.01) |

(52) U.S. Cl.
CPC ............ *H01M 4/54* (2013.01); *H01M 4/483* (2013.01); *H01M 8/188* (2013.01); *H01M 8/20* (2013.01); *Y02E 60/528* (2013.01)

(58) Field of Classification Search
CPC ........ H01M 4/54; H01M 4/483; H01M 8/188; H01M 8/20
See application file for complete search history.

(56) References Cited

U.S. PATENT DOCUMENTS

| | | |
|---|---|---|
| 4,310,609 A | 1/1982 | Liang et al. |
| 5,415,959 A | 5/1995 | Pyszczek et al. |
| 5,516,340 A | 5/1996 | Takeuchi et al. |
| 5,639,577 A | 6/1997 | Takeuchi et al. |
| 5,670,276 A | 9/1997 | Takeuchi et al. |
| 6,566,007 B1 | 5/2003 | Takeuchi et al. |
| 7,939,199 B1 * | 5/2011 | Gan ..................... H01M 4/131 429/209 |

OTHER PUBLICATIONS

Akizuki et al. "AgCu3V4O12: a Novel Perovskite Containing Mixed-Valence Silver ions." Inorganic Chemistry, 2013, 52 (24), pp. 13824-13826.*

* cited by examiner

*Primary Examiner* — James Lee
(74) *Attorney, Agent, or Firm* — Steven W. Winn

(57) ABSTRACT

The present invention related to an electrochemical cell comprising an anode of a Group IA metal and a cathode of a composite material prepared from a combination of vanadium oxide and either a copper or a silver oxide and the other of a copper or a silver nitrate. The cathode material of the present invention provides an increased gravimetric energy density over the cathode active materials of the prior art along with an increased pulse voltage delivery capacity. This makes the cathode material of the present invention particularly useful for implantable medical applications.

31 Claims, 7 Drawing Sheets

COPPER DOPED SVO COMPOUNDS AS HIGH RATE CATHODE MATERIALS

CROSS-REFERENCE TO RELATED APPLICATION

This application claims priority from U.S. Provisional Application Ser. No. 61/907,655, filed Nov. 22, 2013.

TECHNICAL FIELD

This invention relates to the art of electrochemical cells, and more particularly, to a new and improved electrochemical cell, and a cathode therefore. The cell comprises a Group IA anode and a new composite metal-metal oxide-metal oxide cathode material. Still more particularly, the present invention is directed to the preparation of copper-silver-vanadium oxide, $Cu_xAg_yV_4O_Z$ (CSVO), from vanadium oxide combined with a copper nitrate and silver oxide or copper oxide and silver nitrate.

BACKGROUND OF THE INVENTION

It is known to use metal oxides as cathode materials in nonaqueous electrochemical cells. For example, U.S. Pat. No. 4,310,609 to Liang et al. and U.S. Pat. No. 5,670,276 to Takeuchi at al., which are assigned to the assignee of the present invention and incorporated herein by reference, disclose a metal oxide composite cathode comprising metals and metal oxides. The Liang cathode is prepared from readily decomposable precursor compounds, including nitrates of vanadium, silver and copper, decomposed in a combined state, or individually decomposed and thereafter combined in an oxide/decomposable metal salt compound and subsequently decomposed to form the metal oxide composite cathode. More specifically, the preferred cathode composites are prepared by decomposing a vanadium salt, suitably ammonium metavanadate, to produce vanadium pentoxide. A decomposable metal salt, suitably the nitrate of a second metal is then added to the vanadium pentoxide. The second metal is preferably selected from the group consisting of silver, copper, manganese and mixtures thereof. The resultant composite cathode material includes $V_2O_x$ wherein x≤5 combined with one or more of $Ag_2O_y$ wherein y=0 to 1; $CuO_z$ wherein z=0 to 1; and $MnO_k$ wherein k=1 to 3. The composite material is described as a metal oxide-metal oxide, a metal-metal oxide, or a metal-metal oxide-metal oxide. A preferred embodiment of this cathode material has the formula $AgV_2O_{5.5}$, also referred to as SVO.

The Liang et al. patent does not specifically disclose combining vanadium pentoxide with silver and copper as a preparation for the trimetallic compound copper-silver vanadium oxide. In that light, Liang et al. does not specifically disclose a mixture of vanadium pentoxide combined with copper nitrate and silver oxide or copper oxide and silver nitrate, such as is disclosed by the present invention.

The Takeuchi patent discloses a copper silver vanadium oxide (CSVO) having a formulation of $Cu_xAg_yV_2O_z$ that is preferably about 0.01≤x≤1.0, about 0.01≤y≤1.0 and about 5.01≤z≤6.5. The applicants have found that the Takeuchi cathode material is not a crystallographic phase pure formulation. The applicants have discovered that the active cathode formulation disclosed by Takeuchi contains multiple crystallographic phases which tend to affect an electrochemical cell's electrical performance when the material is utilized as an electrochemical cell cathode.

Specifically, the applicants have discovered that the multiple phases that are contained within the Takeuchi CSVO active cathode material have a tendency to increase internal electrical resistance within a cell. As a result, the overall energy capacity of an electrochemical cell constructed with a cathode composed of the Takeuchi CSVO material is generally less than that of an electrochemical cell constructed with a cathode composed of the phase pure copper silver vanadium oxide material of the present invention. In addition, the presence of the multiple phases within the Takeuchi active cathode material generally hinder consistent and reproducible material manufacture. Because the formation of these crystallographic phases require very specific manufacturing conditions, the ability to exactly replicate the amount and growth of these multiple crystallographic phases is difficult to achieve.

The present application therefore, discloses a more preferred crystallographic phase pure copper silver vanadium oxide (CSVO) material having the general formula $Cu_xAg_yV_4O_z$, where x=0.01 to 4, y=0.01 to 4 and z=7.01 to 13.5 and that may be used to produce cathodes for electrochemical cells. The active cathode CSVO material formulation is more manufacturability robust and its electrical properties are less dependent on varying manufacturing conditions. In addition, the phase pure CSVO active cathode material formulation of the present invention provides electrochemical cells having improved energy capacity.

SUMMARY OF THE INVENTION

The present invention relates to an electrochemical cell comprising an anode of a Group IA metal and a cathode of a composite material prepared from a combination of vanadium oxide and either a copper or a silver oxide and the other of a copper or a silver nitrate. The cathode material of the present invention provides a crystallographic phase pure formulation that provides electrochemical cells having a more consistent electrical performance. In addition, the material is more conducive to manufacturing as the material is more robust and its electrical properties are less affected by manufacturing process variations. This makes the cathode material of the present invention particularly useful for implantable medical applications.

DETAILED DESCRIPTION OF THE PREFERRED EMBODIMENTS

Figure 1:
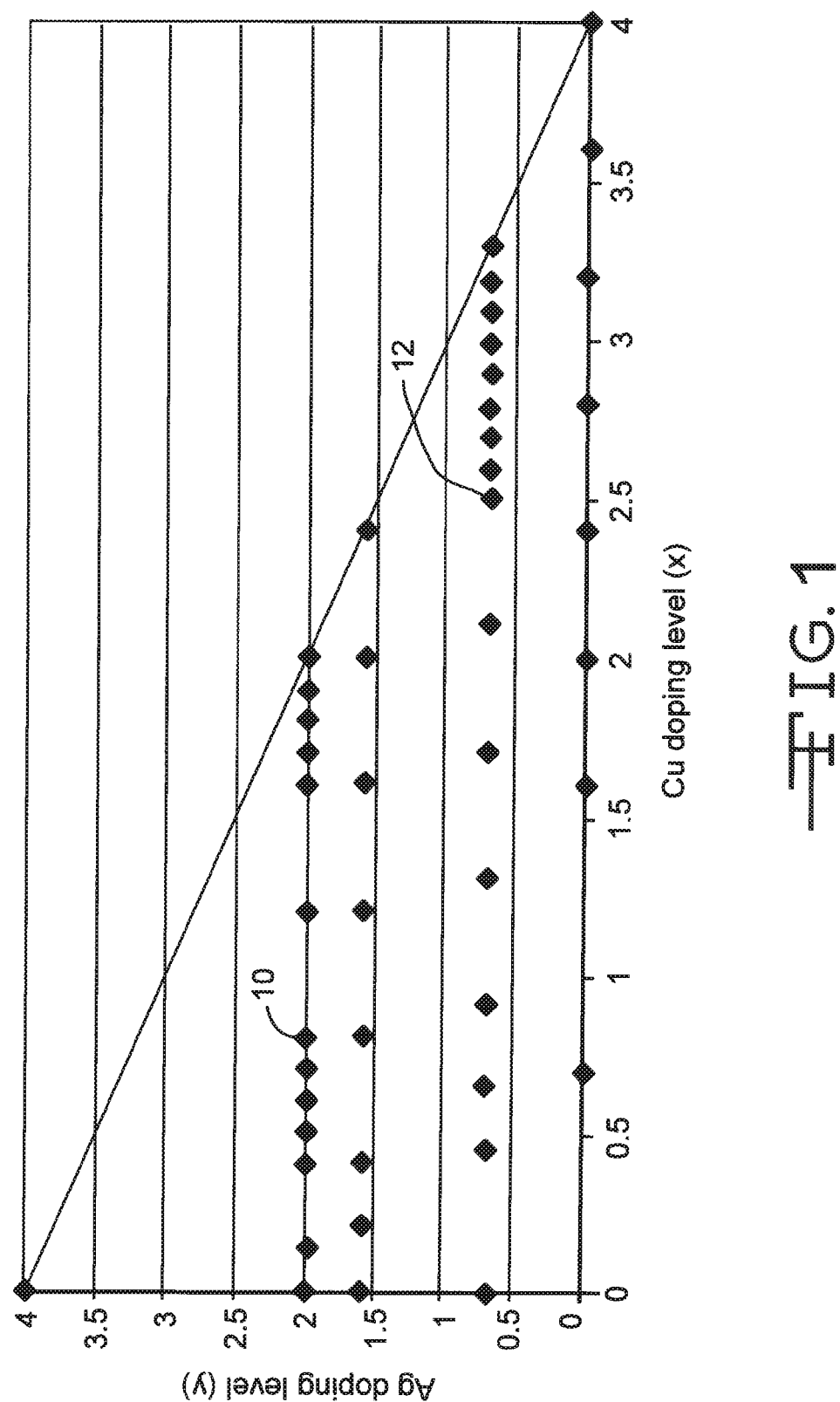
FIG. 1 is a graph illustrating the different active cathode formulations comprising vanadium oxide with differing levels of copper and silver dopant that were subject to the investigation that yielded the preferred formulations of the present invention.

The term "pulse" means a short burst of electrical current of significantly greater amplitude than that of a pre-pulse current or open circuit voltage immediately prior to the pulse. A pulse train consists of at least one pulse of electrical current. The pulse is designed to deliver energy, power or current. If the pulse train consists of more than one pulse, they are delivered in relatively short succession with or without open circuit rest between the pulses.

In performing accelerated discharge testing of a cell, an exemplary pulse train may consist of one to four 5- to 20-second pulses (23.2 mA/cm$^2$) with about a 10 to 30 second rest, preferably about 15 second rest, between each pulse. A typically used range of current densities for cells powering implantable medical devices is from about 15 mA/cm$^2$ to about 50 mA/cm$^2$, and more preferably from about 18 mA/cm$^2$ to about 35 mA/cm$^2$. Typically, a 10-second pulse is suitable for medical implantable applications. However, it could be significantly shorter or longer depending on the specific cell design and chemistry and the associated device energy requirements. Current densities are based on square centimeters of the cathode electrode.

The electrochemical cell of the present invention comprises an anode of a metal selected from Group IA of the Periodic Table of the Elements, including lithium, sodium, potassium, etc., and their alloys and intermetallic compounds including, for example, Li—Si, Li—Al, Li—B and Li—Si—B alloys and intermetallic compounds. The preferred anode comprises lithium.

The form of the anode may vary, but typically, the anode is a thin sheet or foil of the anode metal, pressed or rolled on a metallic anode current collector, i.e., preferably comprising nickel, to form an anode component. In the electrochemical cell of the present invention, the anode component has an extended tab or lead of the same metal as the anode current collector, i.e., preferably nickel, integrally formed therewith such as by welding and contacted by a weld to a cell case of conductive metal in a case-negative configuration. Alternatively, the anode may be formed in some other geometry, such as a bobbin shape, cylinder or pellet to allow an alternate low surface cell design.

The electrochemical cell of the present invention further comprises a cathode, and the electrochemical reaction at the cathode involves conversion of ions which migrate from the anode to the cathode into atomic or molecular forms. The cathode of the present invention, therefore, includes an electrically conductive composite cathode material that comprises a mixture of a first metal oxide and a second metal nitrate incorporated in the matrix of a host metal oxide.

The cathode material of this invention can be constructed by the chemical addition reaction, solid-state reaction or otherwise intimate contact of various metal oxides and/or metal nitrate combinations, preferably during thermal treatment, sol-gel formation, chemical vapor deposition or hydrothermal synthesis in mixed states. The materials thereby produced contain metals and oxides of the Groups IB, IIB, IIIB, IVB, VB, VIB, VIIB, and VIII which includes the noble metals and/or other oxide compounds. As defined herein, a solid state reaction is a chemical reaction in which two solid materials are fused together into one solid material through the application of heat over a prescribed period of time.

Preferred cathode composites are prepared by thermally treating vanadium oxide such as vanadium pentoxide combined with a mixture of metal salts and metal oxides wherein the metal salts are preferably copper and silver salts such as copper nitrate, $Cu(NO_3)_2$, and silver nitrate, $AgNO_3$. More particularly the vanadium oxide is combined with nitrate and non-nitrate starting materials such as copper nitrate and silver oxide or copper oxide and silver nitrate, thoroughly mixed therewith and thereafter heat treated. Thus, the composite cathode material may be described as a metal-metal oxide-metal oxide, and the range of material composition found for $Cu_xAg_yV_4O_z$ (CSVO) is preferably about $0.01 \leq x \leq 4.0$, about $0.01 \leq y \leq 4.0$ and about $7.01 \leq z \leq 13.5$.

Figure 4:
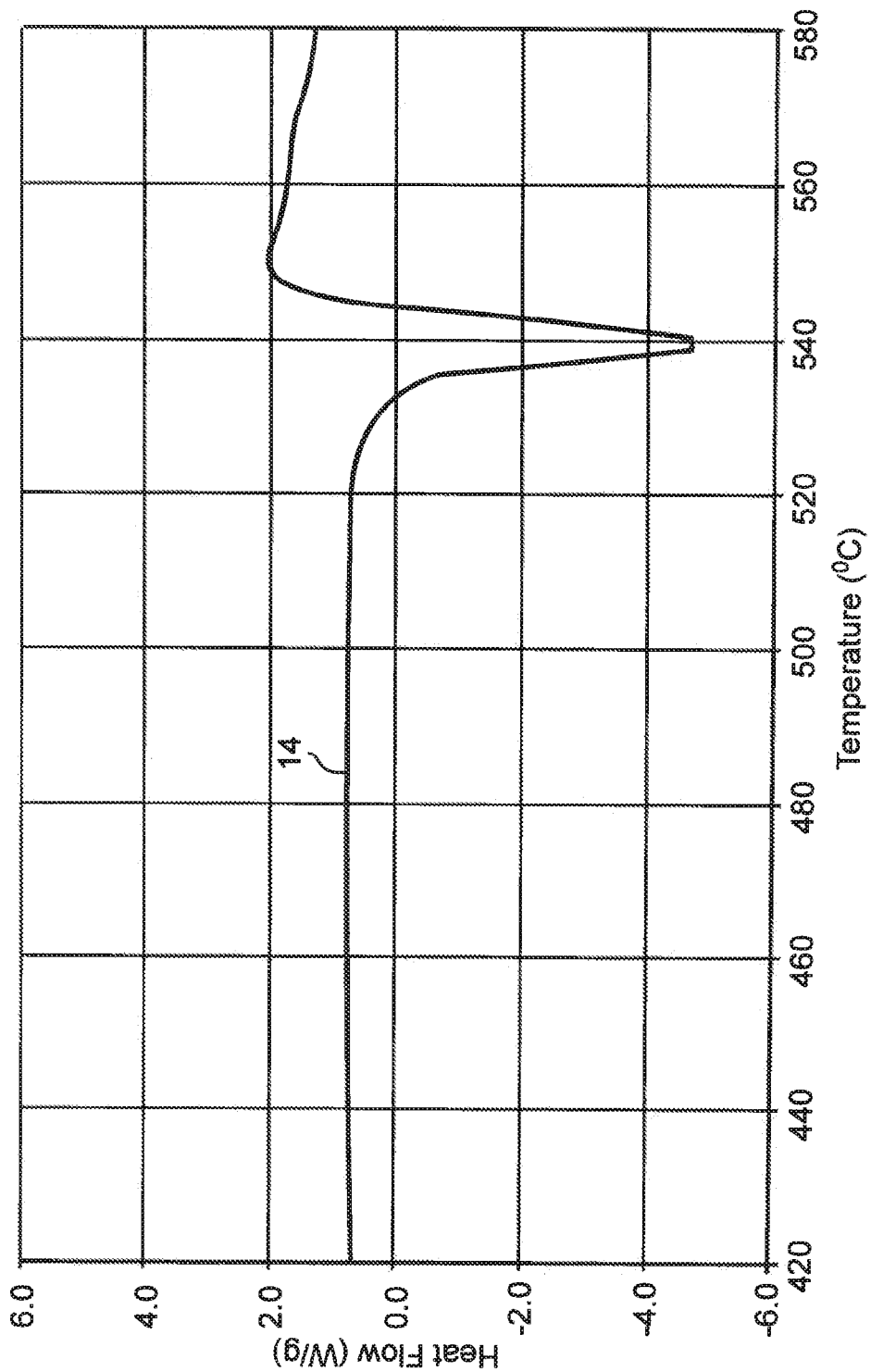
FIG. 4 depicts an embodiment of a differential scanning calorimetry (DSC) pattern for the $Cu_{0.8}Ag_2V_4O_{11.4}$ material formulation.

A typical form of CSVO prepared from the above described nitrate/oxide starting materials is $Cu_{0.8}Ag_2V_4O_z$ with z being about 11.4, and is characterized by an endothermic transition at about 540° C. in the differential scanning calorimetry data (FIG. 4). The oxygen content of this material can vary somewhat depending on preparation conditions, for example, whether the material is prepared in an oxidizing atmosphere or in an inert atmosphere such as in argon, nitrogen and helium, and the like.

Figure 5:
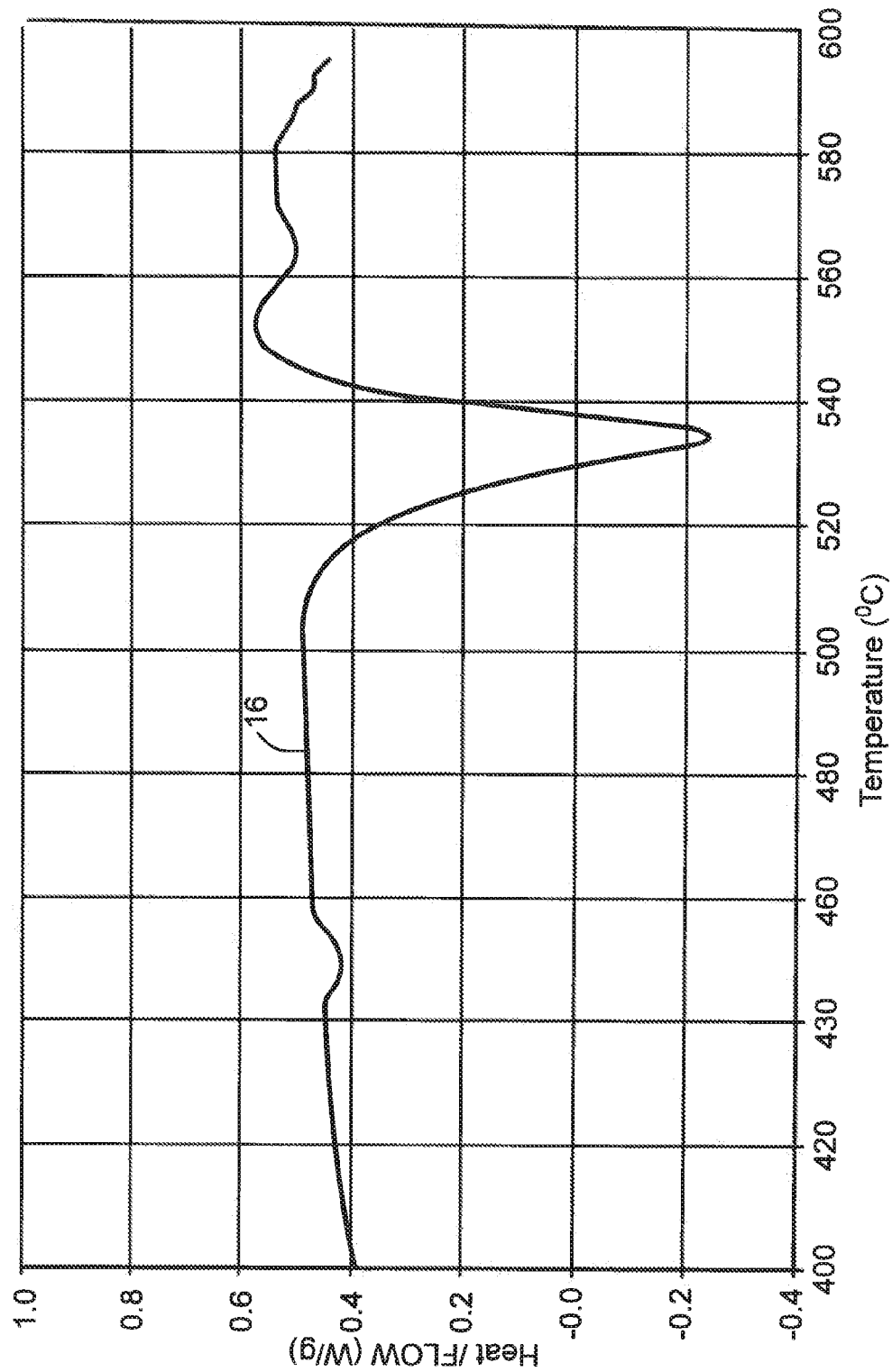
FIG. 5 shows an embodiment of a differential scanning calorimetry (DSC) pattern for the $Cu_{2.5}Ag_{0.7}V_4O_{11.6}$ material formulation.

Another typical form of CSVO prepared according to the present invention has the stoichiometric formula $Cu_{2.5}Ag_{0.7}V_4O_z$ with z being about 11.6, and is characterized by an endothermic transition at about 535° C. in the differential scanning calorimetry data (FIG. 5). Again, the exact proportion of the oxygen content is dictated by the preparation atmosphere.

Figure 2:
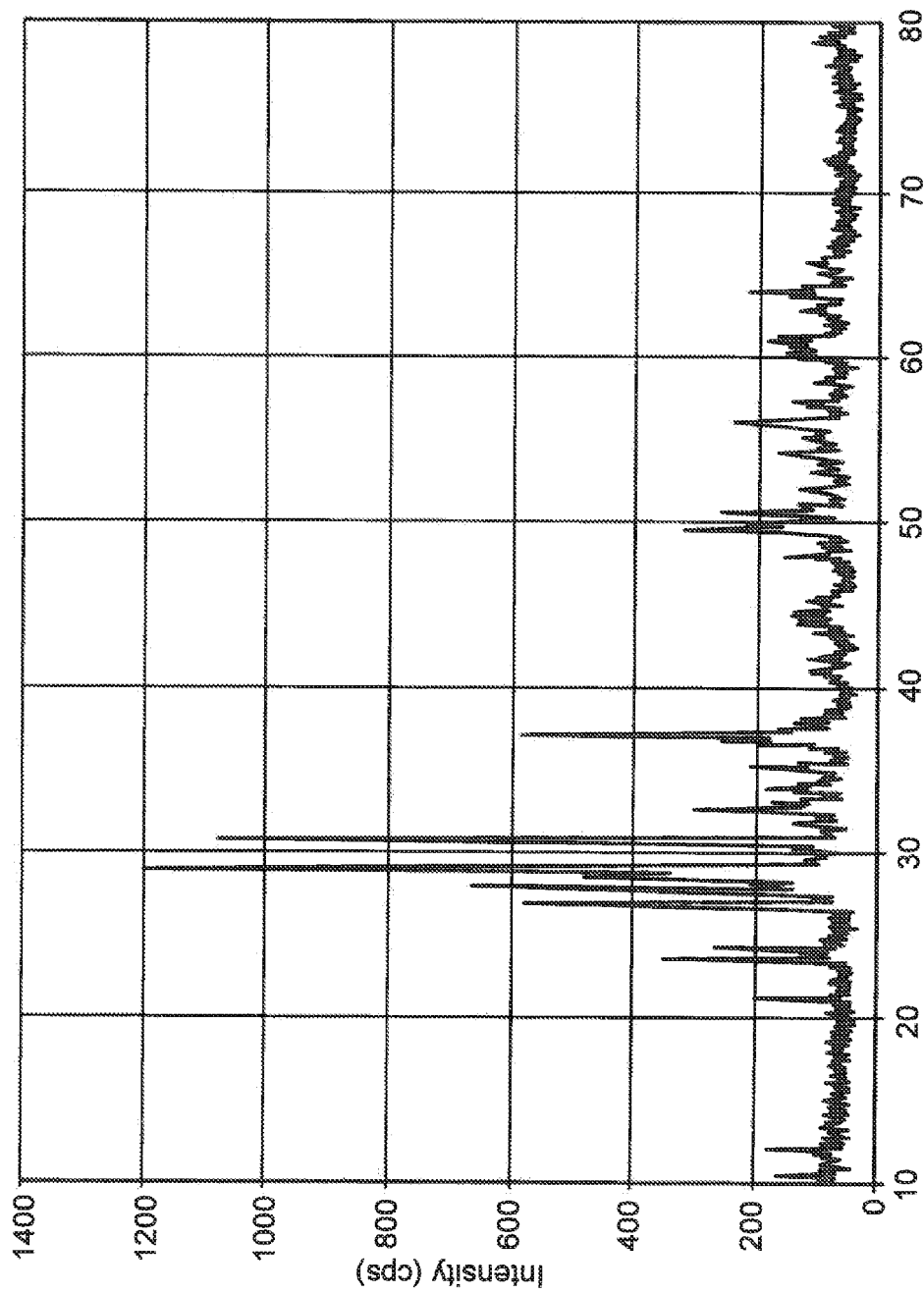
FIG. 2 illustrates an embodiment of an x-ray diffraction pattern for the $Cu_{0.8}Ag_2V_4O_{11.4}$ material formulation.
Figure 3:
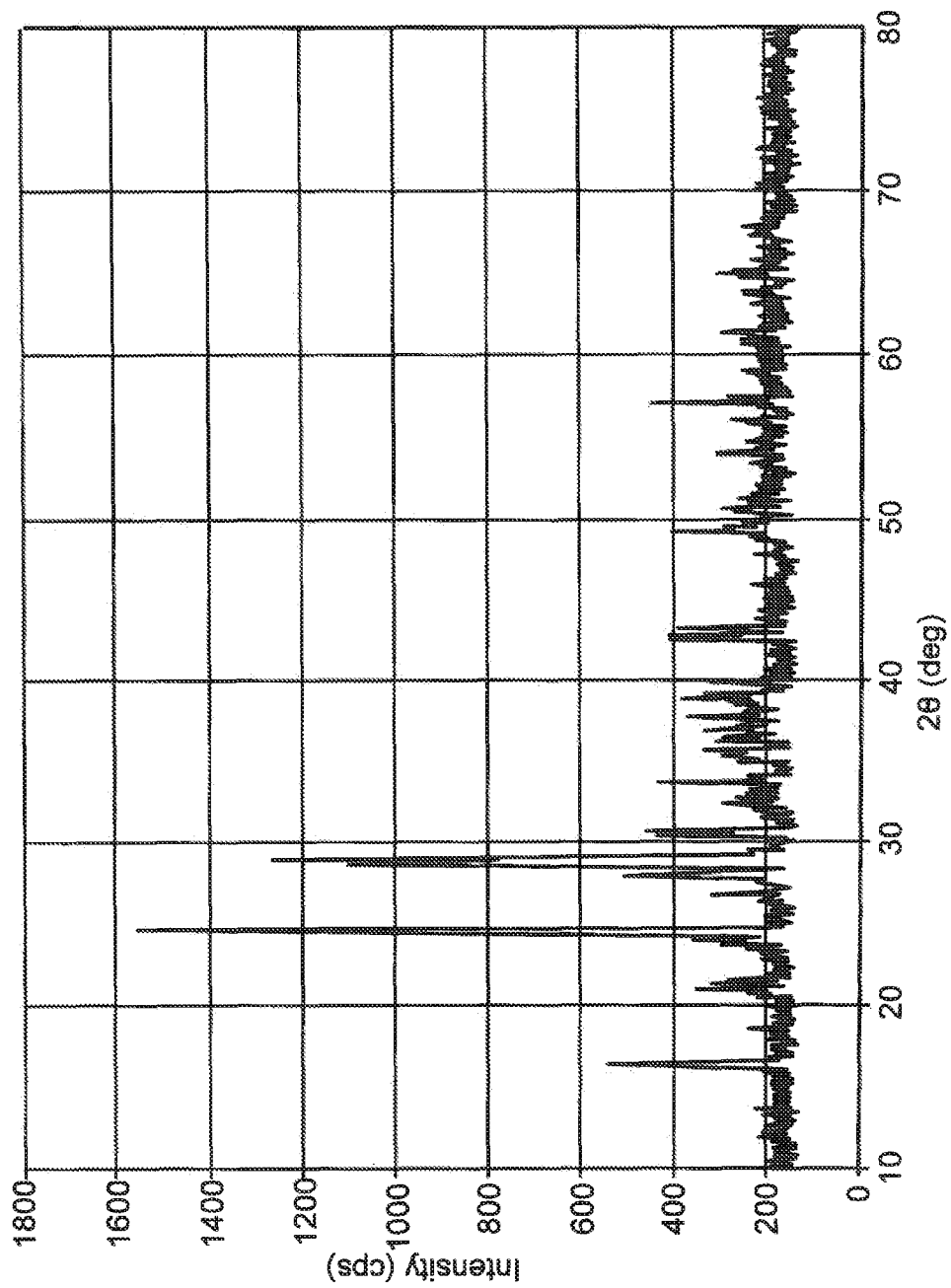
FIG. 3 illustrates an embodiment of an x-ray diffraction pattern for the $Cu_{2.5}Ag_{0.7}V_4O_{11.6}$ material formulation.

A number of experimental formulations were fabricated to determine the optimized phase pure copper silver vanadium oxide active cathode materials of the present invention. FIG. 1 summarizes the different material formulations that were fabricated in determining the preferred crystallographic phase pure CSVO formulations of the present invention. As defined herein, a crystallographic phase pure material exhibits an x-ray diffraction pattern in which the pattern peaks are attributed to the fully reacted resultant material. A crystallographic phase pure material does not exhibit an x-ray diffraction pattern having peaks that are attributed to its initial starting materials that comprise the resultant material. As shown, a total of forty seven material formulations were fabricated and tested to determine the optimized cathode formulations of the present invention. As illustrated, increasing amounts of copper and silver dopant were added to the vanadium pentoxide host material to create a matrix of material trials. Once fabricated, x-ray diffraction analysis was performed on each of these material formulations to determine crystallographic phase purity. Through this X-ray diffraction analysis and extensive trial and error, it was determined that the optimized crystallographic phase pure active cathode material formulations were $Cu_{0.8}Ag_2V_4O_{11.4}$, identified by number 10 in FIG. 1 and $Cu_{2.5}Ag_{0.7}V_4O_{11.6}$, identified by number 12 in FIG. 1. FIG. 2 illustrates the x-ray diffraction pattern of the active cathode material formulation having the stoichiometry of $Cu_{0.8}Ag_2V_4O_{11.4}$ (identification number 10). FIG. 3 illustrates an embodiment of the x-ray diffraction pattern of the active cathode material formulation having the stoichiometry of $Cu_{2.5}Ag_{0.7}V_4O_{11.6}$ (identification number 12).

Such composite materials as those described above may be pressed into a cathode pellet with the aid of a suitable binder material such as a fluoro-resin powder, preferably polytetrafluoroethylene (PTFE) powder, and a material having electronic conductive characteristics such as graphite and/or carbon black. In some cases, no binder material or electronic conductor material is required to provide a similarly suitable cathode body. Further, some of the cathode matrix samples may also be prepared by rolling, spreading or pressing a mixture of the material mentioned above onto a suitable current collector. Cathodes prepared as described above may be in the form of one or more plates operatively associated with at least one or more plates of anode material, or in the form of a strip wound with a corresponding strip of anode material in a structure similar to a "jellyroll".

For example, the cathode active material is preferably mixed with a binder material such as a powdered fluoro-polymer, more preferably powdered polytetrafluoroethylene or powdered polyvinylidene fluoride present at about 1 to about 5 weight percent of the cathode mixture. Further, up to about 10 weight percent of a conductive diluent is preferably added to the cathode mixture to improve conductivity. Suitable materials for this purpose include acetylene black, carbon black and/or graphite or a metallic powder such as powdered nickel, aluminum, titanium, stainless steel, and mixtures thereof. The preferred cathode active mixture thus includes a powdered fluoro-polymer binder present at a quantity of at least about 3 weight percent, a conductive diluent present at a quantity of at least about 3 weight percent and from about 80 to about 98 weight percent of the cathode active material.

A preferred method of cathode preparation is by contacting a blank cut from a free-standing sheet of cathode active material to a current collector. Blank preparation starts by taking granular silver vanadium oxide and adjusting its particle size and distribution to a useful range in an attrition or grinding step. These methods are further described in U.S. Pat. No. 6,566,007 to Takeuchi et al, which is assigned to the assignee of the present invention and incorporated herein by reference.

The exemplary cell of the present invention further includes a separator to provide a physical separation between the anode and cathode. The separator is of an electrically insulative material to prevent an internal electrical short circuit between the electrodes, and the separator material also is chemically unreactive with the anode and cathode active materials and both chemically unreactive with and insoluble in the electrolyte. In addition, the separator material, has a degree of porosity sufficient to allow flow therethrough of the electrolyte during the electrochemical reaction of the cell. Illustrative separator materials include non-woven glass, polypropylene, polyethylene, microporous material, glass fiber materials, ceramics, polytetrafluorethylene membrane commercially available under the designations ZITEX (Chemplast Inc.), polypropylene membrane, commercially available under the designation CELGARD (Celanese Plastic Company Inc.) and DEXIGLAS (C. H. Dexter, Div., Dexter Corp.).

Other separator materials that are useful with the present invention include woven fabric separators comprising halogenated polymeric fibers, as described in U.S. Pat. No. 5,415,959 to Pyszczek et al., which is assigned to the assignee of the present invention and incorporated herein by reference. Examples of halogenated polymeric materials suitable for the electrochemical cell of the present invention include, but are not limited to, polyethylene tetrafluoroethylene which is commercially available under the name Tefzel, a trademark, of the DuPont Company; polyethylenechlorotrifluoroethylene which is commercially available under the name Halar, a trademark of the Allied Chemical Company and polyvinylidene fluoride.

The form of the separator typically is a sheet which is placed between the anode and cathode and in a manner preventing physical contact therebetween. Such is the case when the anode is folded in a serpentine-like structure with a plurality of cathode plates disposed intermediate the anode folds and received in a cell casing or when the electrode combination is rolled or otherwise formed into a cylindrical "jellyroll" configuration.

The exemplary electrochemical cell of the present invention is preferably activated with a nonaqueous, ionically conductive electrolyte operatively associated with the anode and the cathode. The electrolyte serves as a medium for migration of ions between the anode and the cathode during the electrochemical reactions of the cell. The electrolyte is comprised of an inorganic salt dissolved in a nonaqueous solvent and more preferably an alkali metal salt dissolved in a mixture of low viscosity solvents including organic esters, ethers and dialkyl carbonates and high conductivity solvents including cyclic carbonates, cyclic esters and cyclic amides.

Additional low viscosity solvents useful with the present invention include dialkyl carbonates such as tetrahydrofuran (THF), methyl acetate (MA), diglyme, trigylme, tetragylme, dimethyl carbonate (DMC), 1,2-dimethoxyethane (DME), 1,2-diethoxyethane (DEE), 1-ethoxy,2-methoxyethane (EME), ethyl methyl carbonate, methyl propyl carbonate, ethyl propyl carbonate, diethyl carbonate, dipropyl carbonate, and mixtures thereof. High permittivity solvents include cyclic carbonates, cyclic esters and cyclic amides such as propylene carbonate (PC), ethylene carbonate (EC), butylene carbonate, acetonitrile, dimethyl sulfoxide, dimethyl formamide, dimethyl acetamide, γ-valerolactone, γ-butyrolactone (GBL), N-methyl-2-pyrrolidone (NMP), and mixtures thereof. In the present invention, the preferred electrolyte for a LiC/CSVO cell is 0.8M to 1.5M $LiAsF_6$ or $LiPF_6$ dissolved in a 50:50 mixture, by volume, of propylene carbonate and 1,2-dimethoxyethane.

The preferred electrolyte of the present invention comprises an inorganic salt having the general formula $MAF_6$ wherein M is an alkali metal similar to the alkali metal comprising the anode and A is an element selected from the group consisting of phosphorous, arsenic and antimony. Examples of salts yielding $AF_6$ are: hexafluorophosphate ($PF_6$), hexafluoroarsenate ($AsF_6$) and hexafluoroantimonate ($SbF_6$). More preferably, the electrolyte comprises at least one ion-forming alkali metal salt of hexafluoroarsenate or hexafluorophosphate dissolved in a suitable organic solvent wherein the ion-forming alkali metal is similar to the alkali metal comprising the anode. Thus, in the case of an anode comprising lithium, the alkali metal salt of the electrolyte preferably comprises either lithium hexafluoroarsenate or lithium hexafluorophosphate dissolved in a 50/50 solvent mixture (by volume) of PC/DME. For a more detailed description of a nonaqueous electrolyte for use in the exemplary cell of the present invention, reference is made to U.S. Pat. No. 5,580,683, which is assigned to the assignee of the present invention and incorporated herein by reference.

A suitable electrolyte may have an inorganic, conically conductive lithium salt dissolved in a mixture of aprotic organic solvents comprising a low viscosity solvent and a high permittivity solvent. Preferred lithium salts include $LiPF_6$, $LiBF_4$, $LiAsF_6$, $LiSbF_6$, $LiClO_4$, $LiO_2$, $LiAlCl_4$, $LiGaCl_4$, $LiC(SO_2CF_3)_3$, $LiN(SO_2CF_3)_2$, LiSCN, $LiO_3SCF_3$, $LiC_6FSO_3$, $LiO_2CCF_3$, $LiSO_6F$, $LiB(C_6H_5)_4$, $LiCF_3SO_3$, and mixtures thereof.

The preferred form of the electrochemical cell is a case-negative design wherein the anode/cathode couple is inserted into a conductive metal casing connected to the anode current collector, as is well known to those skilled in the art. A preferred material for the casing is stainless steel, although titanium, mild steel, nickel, nickel-plated mild steel and aluminum are also suitable. The casing header comprises a metallic lid having a sufficient number of openings to accommodate the glass-to-metal seal/terminal pin feedthrough for the cathode. The anode is preferably connected to the case or the lid. An additional opening is provided for electrolyte filling. The casing header comprises elements having compatibility with the other components of the electrochemical cell and is resistant to corrosion. The cell is thereafter filled with the electrolyte solution described hereinabove and hermetically sealed, such as by close-welding a stainless steel plug over the fill hole, but not limited thereto. The cell of the present invention can also be constructed in a case-positive design.

One preferred form of the cell assembly described herein is referred to as a wound element cell. That is, the fabricated cathode, anode and separator are wound together in a "jellyroll" end type configuration or "wound element cell stack" such that the anode is on the outside of the roll to make electrical contact with the cell case in a case-negative configuration. Using suitable top and bottom insulators, the wound cell stack is inserted into a metallic case of a suitable size dimension. The metallic case may comprise materials such as stainless steel, mild steel, nickel-plated mild steel, titanium or aluminum, but not limited thereto, so long as the metallic material is compatible for use with components of the cell The cell header comprises a metallic disc-shaped body with a first hole to accommodate a glass-to-metal seal/terminal pin feedthrough and a hole for electrolyte filling. The glass used is a corrosion resistant type having from between about 0% to about 50% by weight silicon such as CABAL 123, TA 23 or FUSITE 425 or FUSITE 435. The positive terminal pin feedthrough preferably comprises titanium although molybdenum and aluminum can also be used The cell header comprises elements having compatibility with the other components of the electrochemical cell, and is resistant to corrosion. The cathode lead is welded to the positive terminal pin in the glass-to-metal seal and the header is welded to the case containing the electrode stack. The cell is thereafter filled with the electrolyte described hereinabove and hermetically sealed such as by close-welding a stainless steel ball over the fill hole, but not limited thereto. This above assembly describes a case-negative cell which is the preferred construction of the exemplary cell of the present invention. As is well known to those skilled in the art, the exemplary electrochemical system of the present invention can also be constructed in a case-positive configuration.

The electrochemical cell of the present invention operates in the following manner. When the ionically conductive electrolyte becomes operatively associated with the anode and the cathode of the cell, an electrical potential difference is developed between terminals operatively connected to the anode and the cathode. During discharge, the electrochemical reaction at the anode includes oxidation to form metal ions and the electrochemical reaction at the cathode involves conversion of these ions which migrate from the anode into atomic or molecular forms. It is observed that the electrochemical cell of this invention has a wide operating temperature range of about −20° C. to +70° C. Advantages of the CSVO cathode material according to the present invention include a high delivered capacity for the intercalation of lithium and reduced voltage delay under high rate applications, such as in batteries for implantable cardiac defibrillators, together with the cost saving resulting from the reduced amount of silver as starting material.

The electrochemical cell according to the present invention is illustrated further by the following examples.

EXAMPLE I

Material Test Sample A

A test sample of copper silver vanadium oxide (material identification number 10 FIG. 1) was synthesized via a solid-state reaction of commercially available vanadium pentoxide, $V_2O_5$, that was mixed together with copper(II) oxide, CuO, and silver nitrate, $AgNO_3$. Specifically, silver nitrate, $AgNO_3$ (16.99 g, 0.1 mol) was added to a mixture of solid copper(II) oxide, CuO (3.19 g, 0.04 mol) and vanadium oxide $V_2O_5$ (18.19 g, 0.1 mol). This powder was ground to thoroughly mix the components such as with a mortar and pestle. Alternatively, an attrition ball mill may be used to thoroughly mix the components together. The mixture and was subjected to a first heat treatment whereby the mixture was heated to about 300° C. within ambient atmosphere conditions for about 19 hours, and mixed again. The powder mixture was then subjected to a second heat treatment whereby the mixture was heated to about 500° C. within ambient atmosphere conditions for about 20 hours. Upon cooling, the material was used without further preparation.

This cathode active material had the stoichiometric formula of $Cu_{0.8}Ag_2V_4O_z$ with z being about 11.4. The oxygen content in $Cu_{0.8}Ag_2V_4O_z$ is designated by z of about 11.4 since the exact stoichiometry of oxygen depends on the conditions and methods used in preparation of the material. Using similar starting materials with the preparation taking place in an inert atmosphere such as nitrogen, argon or helium, the oxygen content of the above cathode active material is somewhat less than 11.4.

EXAMPLE II

Material Test Sample B

A test sample of copper silver vanadium oxide (material identification number 12 FIG. 1) was synthesized via a solid-state reaction of commercially available vanadium pentoxide, $V_2O_5$, was mixed together with copper(II) oxide, CuO, and silver nitrate, $AgNO_3$. Specifically, material test sample B was synthesized by combining silver nitrate, $AgNO_3$ (5.95 g, 0.04 mol) with a mixture of solid copper(II) oxide, CuO (9.94 g, 5.95 mol) and vanadium oxide $V_2O_5$ (18.19 g, 0.1 mol). This powder was ground to thoroughly mix the components, with a mortar and pestle. Similarly an attrition ball mill may also be used to thoroughly mix the material components. The mixture and was subjected to the same heat treatment as prescribed in Example I.

This cathode active material had the stoichiometric formula of $Cu_{2.5}Ag_{0.7}V_4O_z$ with z being about 11.6. The oxygen content in $Cu_{2.5}Ag_{0.7}V_4O_z$ is designated by z of about 11.6 since the exact stoichiometry of oxygen depends on the conditions and methods used in preparation of the material. Using similar starting materials with the preparation taking place in an inert atmosphere such as nitrogen, argon or helium, the oxygen content of the above cathode active material is somewhat less than 11.6.

COMPARATIVE EXAMPLE I

Material Control Sample

A comparative material sample of silver vanadium oxide (SVO) was fabricated and used as a control to material test samples A and B as described in respective Examples I and II. The control sample was synthesized via a solid-state reaction using commercially available vanadium pentoxide, $V_2O_5$ that was mixed together with silver nitrate, $AgNO_3$. The material control sample was devoid of copper oxide to illustrate the attributes of the copper dopant used in Examples I and II.

Silver nitrate, $AgNO_3$ (84.96 g, 0.5 mol) was added to vanadium oxide $V_2O_5$ (90.94 g, 0.5 mol). This powder was ground to thoroughly mix the components, using a mortar and pestle. The mixture and was subjected to the same heat treatment as prescribed in Example 1. The cathode active control material had the stoichiometric formula of $Ag_2V_4O_z$, with z being about 11.0.

EXAMPLE III

Thermal Analysis of Materials

Figure 6:
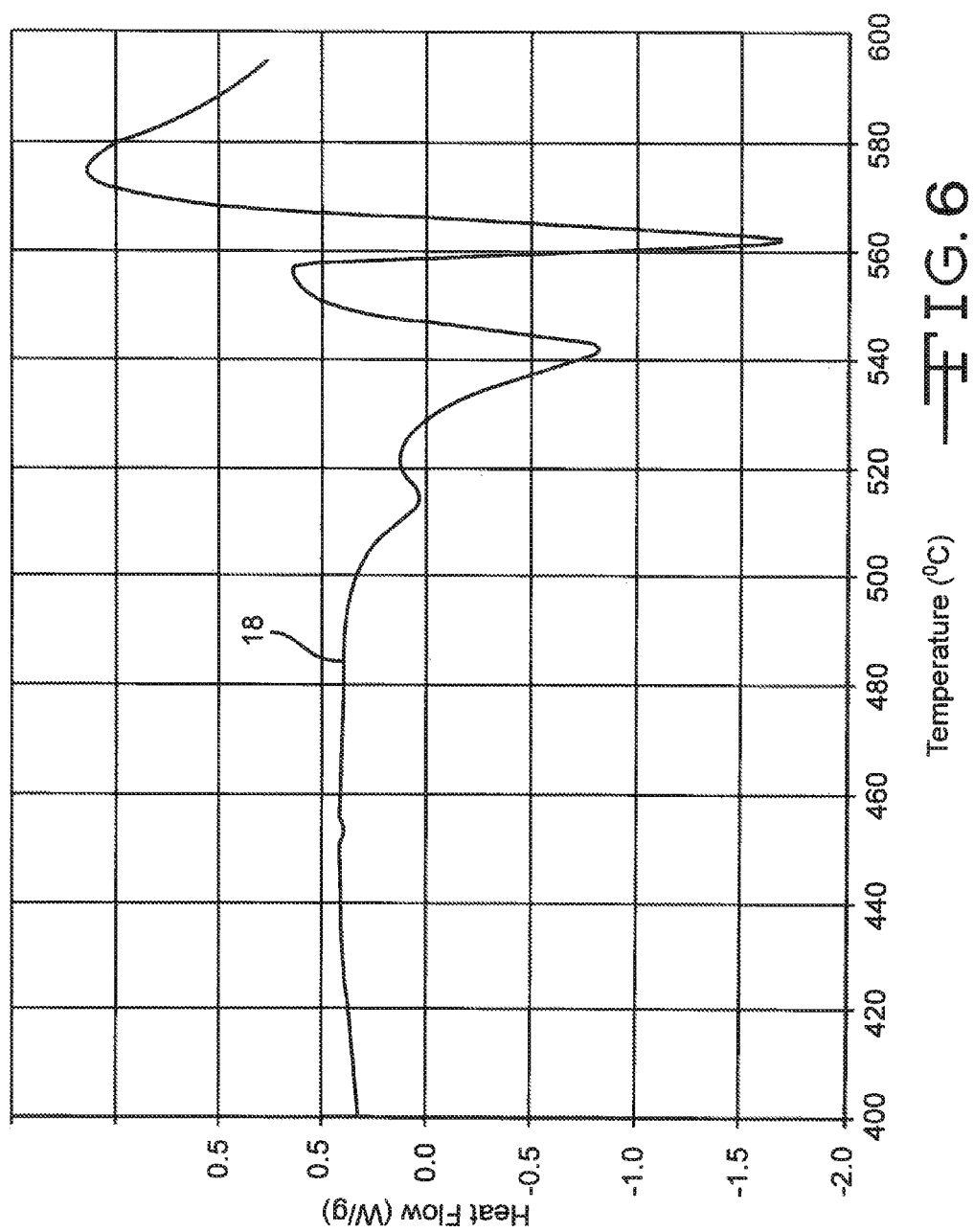
FIG. 6 depicts an embodiment of a differential scanning calorimetry (DSC) pattern for the $Ag_2V_4O_{11}$ material formulation.

Differential Scanning calorimetry (DSC) data was obtained for the two CSVO test samples and the control SVO sample made according to Examples I, II and Comparative Example I, respectively. The results of scans from about 25° C. to 600° C. are presented in FIGS. 4, 5 and 6. FIG. 4 illustrates the DSC profile, indicated by curve 14 for the CSVO formulation, identification number 10 in FIG. 1, made from silver nitrate and copper oxide combined with vanadium oxide as set forth in Example I. FIG. 5 illustrates the DSC profile, indicated by curve 16 for CSVO formulation, identification number 12 in FIG. 1, made from silver nitrate and copper oxide combined with vanadium oxide as set forth in Example II. FIG. 6 illustrates the DSC profile, indicated by curve 18, for the SVO control material made from silver nitrate and vanadium oxide as set forth in Comparative Example I.

Both material test samples A and B only displayed a single DSC endothermic transition that ranged from about 530° C. to about 540° C., specifically at about 540° C. for test sample A and about 534° C. for test sample B. In contrast, the DSC profile of the SVO comparative control sample demonstrated a double endothermic transition at about 541° C. and 562° C., respectively. The DSC data thus indicates that the differing dopant levels of the copper (II) oxide and silver nitrate significantly altered the chemical structure of the CSVO test samples A and B, particularly in comparison to the SVO control formulation.

EXAMPLE IV

Electrochemical Test Cells

Identical lithium anode electrochemical cells, with the exception of the cathode material, were constructed to test and compare the electrical performance properties of the respective CSVO test cathode active materials made according to Examples I, II and the SVO control material made according to Comparative Example I. A set of three Li/CSVO identical cells were built each cell comprising a cathode of a pressed powder pellet with polytetrafluoroethylene (PTFE) binder contacted to a current collector of cathode for each material, test samples A and B provided in Examples I and II. An additional set of two Li/SVO cells were also built comprising a cathode of a pressed pellet with polytetrafluoroethylene (PTFE) binder of cathode active material mixture contacted to a current collector for the control SVO cathode material provided in Comparative Example I.

Each cell of the respective sets of cells was discharged at 37° C under a constant load of 2.7 kΩ for a 1 month period of time to 100% depth of discharge (DoD). The cells were each subjected to a pulse train of four 10-second 1050 mA sequential current pulses, each of the four sequential pulses were separated by a 15 second rest period. The pulse train was administered every 2 days resulting in a current density of 35 $mA/cm^2$.

Figure 7:
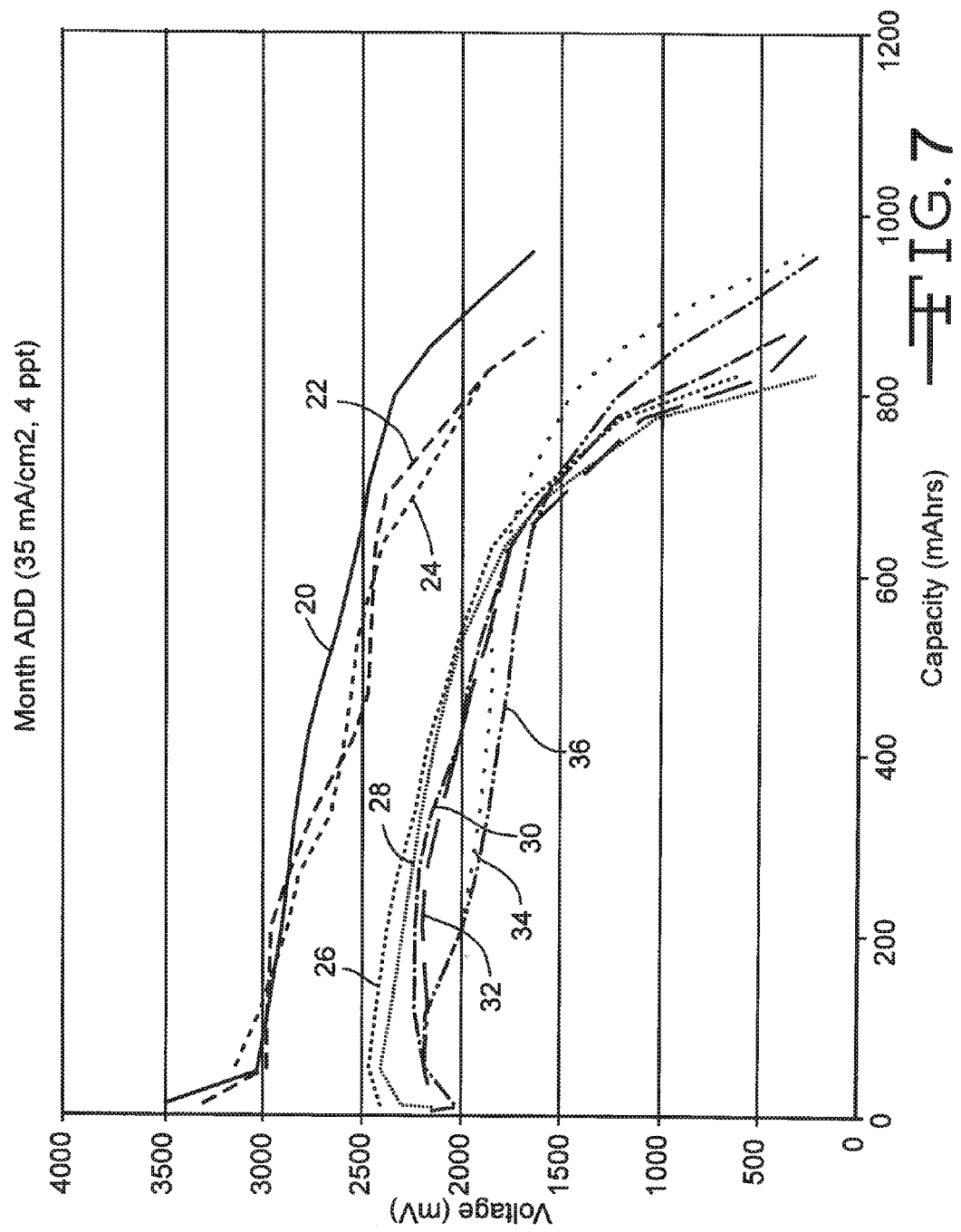
FIG. 7 illustrates the results of depth of discharge testing that was performed on electrochemical cells constructed with a lithium anode and a cathode comprised of silver vanadium oxide and the copper doped silver vanadium oxide material formulations of the present invention.

FIG. 7 illustrates the results of the depth of discharge testing. The DOD test results shown in FIG. 7 represent the average readings of the cells constructed with cathodes comprising cathode material formulations, $Cu_{0.8}Ag_2V_4O_{11.4}$, $Cu_{2.5}Ag_{0.7}V_4O_{11.6}$, and control formulation $Ag_2V_4O_{11}$. Specifically, FIG. 7 shows the average pre pulse or background voltages as curves 20, 22, 24, and the respective average minimum pulse ($P_{min}$) voltages as curves 26, 28, 30, 32, 34 and 36 for each of the three groups of test cells constructed with the respective cathode material.

Table I below summarizes the DOD test results per cathode formulation while a current pulse was applied. The "Reading" column identifies the sequential number of the current pulse that was measured that comprised the pulse train. For example, P1 corresponds to the first current pulse and P4 is the fourth current pulse of the train that applied to the cell. "Capacity 1.5V Cutoff" details the energy capacity in milli Amp hours that was exhibited when a cell reached an output voltage of about 1.5V. "Total Capacity" details the total energy capacity in mAhrs at which a cell reached complete electrical energy depletion. As defined herein, "capacity" is the amount of electrical energy that an electrochemical cell can deliver at a rated voltage.

TABLE I

| Material Formulation | Curve Number | Reading | Capacity 1.5 V Cutoff (mAhrs) | Total Capacity (mAhrs) |
|---|---|---|---|---|
| $Ag_{2.0}V_4O_{11}$ | 24 | Pre pulse | N/A | N/A |
| $Ag_{2.0}V_4O_{11}$ | 26 | P1min | 710 | 810 |
| $Ag_{2.0}V_4O_{11}$ | 28 | P4min | 700 | 825 |
| $Cu_{0.8}Ag_2V_4O_{11.4}$ | 22 | Pre pulse | N/A | N/A |
| $Cu_{0.8}Ag_2V_4O_{11.4}$ | 30 | P1min | 705 | 875 |
| $Cu_{0.8}Ag_2V_4O_{11.4}$ | 32 | P4min | 680 | 875 |
| $Cu_{2.5}Ag_{0.7}V_4O_{11.6}$ | 20 | Pre pulse | N/A | N/A |
| $Cu_{2.5}Ag_{0.7}V_4O_{11.6}$ | 34 | P1min | 800 | 960 |
| $Cu_{2.5}Ag_{0.7}V_4O_{11.6}$ | 36 | P4min | 710 | 960 |

As FIG. 7 and Table I illustrate, cells constructed with cathodes comprising the material formulation of $Cu_{2.5}Ag_{0.7}V_4O_{11.6}$ (material test sample B) exhibited the greatest energy capacity. Cells constructed with this cathode material formulation generally exhibited an increased energy capacity in comparison to cells constructed with $Cu_{0.8}Ag_2V_4O_{11.4}$, material test sample A, and SVO cathode material, the comparative control material, at both the 1.5V output and at cell depletion points. For example, when the test cells reached an output of 1.5V, the energy capacity of cells constructed with cathodes comprising $Cu_{2.5}Ag_{0.7}V_4O_{11.6}$ (material test sample B) was 800 and 710 mAhrs for the first and fourth current pulses, respectively.

In comparison, cells constructed with the SVO comparative cathode material exhibited energy capacities of 710 and 700 mAhrs at the 1.5V output for the first and fourth current pulses, respectively. In addition, cells constructed with cathodes comprising $Cu_{0.8}Ag_2V_4O_{11.4}$, material test sample A, also exhibited lower energy capacities in comparison to cells constructed with material test sample B. Specifically, cells constructed with material test sample A exhibited energy capacities of 705 and 680 mAhrs at a 1.5V output for the first and fourth pulses, respectively.

TABLE II

| Material Formulation | Curve Number | Capacity 2.0 V Cutoff (mAhrs) | Capacity 2.3 V Cutoff (mAhrs) |
|---|---|---|---|
| $Ag_{2.0}V_4O_{11}$ | 24 | 783 | 670 |
| $Cu_{0.8}Ag_2V_4O_{11.4}$ | 22 | 792 | 709 |
| $Cu_{2.5}Ag_{0.7}V_4O_{11.6}$ | 20 | 889 | 815 |

Table II above summarizes the observed capacities delivered at the background voltages of 2.0V and 2.3V, respectively. As further illustrated by Table II, increasing the amount of copper in the cathode formulation resulted in an increased electrochemical cell capacity. For example, when the test cells reached background voltages of 2.0V and 2.3V, the energy capacities of cells constructed with cathodes comprising $Cu_{2.5}Ag_{0.7}V_4O_{11.6}$ (material test sample B) were 889 and 815 mAhrs, respectively. In comparison, cells constructed with the SVO comparative cathode material exhibited energy capacities of 783 and 670 mAhrs at the background voltage output of 2.0V and 2.3V, respectively. In addition, cells constructed with cathodes comprising $Cu_{0.8}Ag_2V_4O_{11.4}$, material test sample A, also exhibited lower energy capacities in comparison to cells constructed with material test sample B. Cells constructed with material test sample A exhibited energy capacities of 792 and 709 mAhrs at background voltage outputs of 2.0V and 2.3V, respectively.

TABLE III

| Material Formulation | Theoretical Deliverable Capacity (mAhr/g) |
|---|---|
| $Ag_{2.0}V_4O_{11}$ | 315 |
| $Cu_{0.8}Ag_2V_4O_{11.4}$ | 320 |
| $Cu_{2.5}Ag_{0.7}V_4O_{11.6}$ | 352 |

Table III above details the calculated theoretical capacities per gram of active cathode material delivered at a background voltage of 2.0V. The theoretical values were calculated using the capacity per gram of lithium (3860 mAhr/g) along with the respective molecular weights of lithium and the active cathode material in conjunction with the number of lithium ions discharged per mole using the respective active cathode material. Complete discharge of copper from a +1 valence to a 0 valence, silver from a +1 valence to a 0 valence, and vanadium from a +4 valence to a +2.75 valence was assumed in the calculations. Thus, it was calculated that about 8.2 lithium ions discharge per mole of $Cu_{2.5}Ag_{0.7}V_4O_{11.6}$ and about 7.8 lithium ions discharge per mole of $Cu_{0.8}Ag_2V_4O_{11.4}$. For example, the theoretical deliverable capacity for $Cu_{2.5}Ag_{0.7}V_4O_{11.6}$ was calculated as follows: [3860 mAhr/g×6.941 g (of Li)/mole× 8.2 Li ions/mole of $Cu_{2.5}A_{0.7}V_4O_{11.6}$]/[623.7 g (of $Cu_{2.5}Ag_{0.7}V_4O_{11.6}$)/mole]=352 mAhr/g.

As illustrated, cells constructed with cathodes comprising the material formulation of $Cu_{2.5}Ag_{0.7}V_4O_{11.6}$ (material test sample B) were calculated to exhibit the greatest theoretical deliverable capacity per gram of active cathode material. Specifically, cells constructed with this cathode material formulation were calculated to have a theoretical capacity of 352 mAhr per gram of the test sample B material at a background voltage of 2.0V. In comparison, cells constructed with the SVO comparative cathode material were calculated to have a theoretical deliverable capacity of 315 mAhr per gram of SVO at 2.0V. In addition, cells constructed with cathodes comprising $Cu_{0.8}Ag_2V_4O_{11.4}$ were calculated to have a theoretical deliverable capacity of 320 mAhr per gram of the test sample A material at 2.0V.

The above detailed description and examples are intended for purposes of illustrating the invention and are not to be construed as limited.

What is claimed is:

1. An electrochemical cell, comprising:
   a) an anode of a Group IA metal;
   b) a cathode comprising a cathode active material as a mixture of vanadium oxide and either a copper oxide and a silver nitrate, or a copper nitrate and a silver oxide, wherein the cathode active material has a general formula of $Cu_xAg_yV_4O_z$, wherein $0.01 \leq x \leq 4.0$, $0.1 \leq y \leq 4.0$ and $7.01 \leq z \leq 13.5$; and
   c) an ionically conductive electrolyte activating the anode and the cathode.

2. The electrochemical cell of claim 1 wherein the general formula has $0.5 \leq x \leq 3.0$ and $0.5 \leq y \leq 2.5$.

3. An electrochemical cell, comprising:
   a) an anode of a Group IA metal which is electrochemically oxidized to form metal ions in the cell upon discharge to generate an electron flow in an external electrical circuit connected to the cell;
   b) a cathode of a cathode active material; and
   c) an ionically conductive electrolyte activating the anode and the cathode,
   d) wherein the cathode active material is characterized as a reaction product of vanadium oxide and a mixture of either a silver oxide and a copper nitrate, or a copper oxide and a silver nitrate so that the cathode active material has a stoichiometric formulation consisting of either $Cu_{0.8}Ag_2V_4O_z$ with z being about 11.4 or $Cu_{2.5}Ag_{0.7}V_4O_z$ with z being about 11.6.

4. The electrochemical cell of claim 3 wherein the mixture of the copper nitrate and the silver oxide includes silver in either the silver(II), silver(I) or silver(0) oxidation states.

5. The electrochemical cell of claim 3 wherein the mixture of the silver nitrate and the copper oxide includes copper in either the copper(II), copper(I) or copper(0) oxidation states.

6. The electrochemical cell of claim 3 wherein the vanadium oxide comprises $V_4O_z$ with $7.01 \leq z \leq 13.5$.

7. The electrochemical cell of claim 3 wherein the cathode active material is prepared from starting materials comprising vanadium oxide reacted with either the silver oxide and the copper nitrate, or with the copper oxide and the silver nitrate, the starting materials having been reacted by one of the group consisting of a thermal treatment, sol-gel formation, chemical vapor deposition and hydrothermal synthesis.

8. The electrochemical cell of claim 3 wherein the cathode further comprises a binder material.

9. The electrochemical cell of claim 8 wherein the binder material is a fluoro-resin powder.

10. The electrochemical cell of claim 3 wherein the cathode further comprises a conductive additive material.

11. The electrochemical cell of claim 10 wherein the conductive additive material is selected from the group consisting of carbon, graphite and a combination thereof.

12. The electrochemical cell of claim 3 wherein the electrolyte comprises a Group IA metal salt dissolved in a nonaqueous solvent.

13. The electrochemical cell of claim 12 wherein the nonaqueous solvent comprises an inorganic solvent.

14. The electrochemical cell of claim 12 wherein the nonaqueous solvent comprises an organic solvent.

15. The electrochemical cell of claim 3 wherein the cathode active material having the stoichiometric formulation of $Cu_{0.8}Ag_2V_4O_{11.4}$ is characterized by an endothermic transition in differential scanning calorimetry data at about 540° C.

16. The electrochemical cell of claim 3 wherein the cathode active material having the stoichiometric formulation of $Cu_{2.5}Ag_{0.7}V_4O_{11.6}$ is characterized by an endothermic transition in differential scanning calorimetry data at about 535° C.

17. A cathode for an electrochemical cell, the cathode comprising a cathode active material as a mixture of vanadium oxide and either a copper nitrate and a silver oxide, or a copper oxide and a silver nitrate, wherein the cathode active material has the general formula $Cu_xAg_yV_4O_z$, wherein 0.01≤x≤4.0, 0.1≤y≤4.0 and 7.01≤z≤13.5.

18. The cathode of claim 17 wherein in the general formula x ≤z.

19. A cathode for an electrochemical cell, the cathode comprising a cathode active material characterized as a reaction product formed by either a thermal decomposition reaction or a thermal addition reaction of vanadium oxide and a mixture of either a silver oxide and a copper nitrate, or a copper oxide and a silver nitrate, and wherein the cathode active material has a stoichiometric formulation consisting of either $Cu_{0.8}Ag_2V_4O_z$ with z being about 11.4 or $Cu_{2.5}Ag_{0.7}V_4O_z$ with z being about 11.6.

20. The cathode of claim 19 wherein one component of the cathode active material comprises $V_4O_z$ with 7.01≤z≤13.5.

21. The cathode of claim 19 wherein the mixture of the copper nitrate and the silver oxide includes silver in either the silver(II), silver(I) or silver(O) oxidation states.

22. The cathode of claim 19 wherein the mixture of the silver nitrate and the copper oxide includes copper in either the copper(II), copper(I) or copper(O) oxidation states.

23. The cathode of claim 19 wherein the cathode active material is prepared from starting materials comprising vanadium oxide and the mixture of either the silver oxide and the copper nitrate, or the copper oxide and the silver nitrate reacted together by one of the group consisting of a thermal treatment, sol-gel formation, chemical vapor deposition and hydrothermal synthesis.

24. The cathode of claim 19 wherein the cathode further comprises a binder material.

25. The cathode of claim 24 wherein the binder material is a fluoro-resin powder.

26. The cathode of claim 19 wherein the cathode further comprises a conductive additive material.

27. The cathode of claim 26 wherein the conductive additive material is selected from the group consisting of carbon, graphite and a combination thereof.

28. The cathode of claim 19 wherein the cathode active material having the stoichiometric formulation of $Cu_{0.8}Ag_{2.0}V_4O_{11.4}$ is characterized by an endothermic transition in differential scanning calorimetry data at about 540° C.

29. The cathode of claim 19 wherein the cathode active material having the stoichiometric formulation of $Cu_{2.5}Ag_{0.7}V_4O_{11.6}$ is characterized by an endothermic transition in differential scanning calorimetry data at about 535° C.

30. A method of making a cathode for an electrochemical cell, the cathode comprising a cathode active material, which method comprises the steps of:
  a) combining vanadium oxide with a mixture comprising either a silver oxide and a copper nitrate, or a copper oxide and a silver nitrate to provide a metal oxide matrix admixture;
  b) reacting the metal oxide matrix admixture to provide the cathode active material having the general formula $Cu_xAg_yV_4O_z$, wherein 0.01≤x≤4.0, 0.1≤y≤4.0 and 7.01≤z≤13.5; and
  c) forming the cathode active material into the cathode of a desired shape.

31. A method of making a cathode for an electrochemical cell, the cathode comprising a cathode active material, which method comprises the steps of:
  a) combining vanadium oxide with a mixture comprising either a silver oxide and a copper nitrate, or a copper oxide and a silver nitrate to provide a metal oxide matrix admixture;
  b) reacting the metal oxide matrix admixture to provide the cathode active material having a stoichiometric formulation consisting of either $Cu_{0.8}Ag_2V_4O_z$ with z being about 11.4 or $Cu_{2.5}Ag_{0.7}V_4O_z$ with z being about 11.6; and
  c) forming the material into the cathode of a desired shape.

* * * * *